United States Patent
Reese et al.

(10) Patent No.: US 11,755,221 B1
(45) Date of Patent: Sep. 12, 2023

(54) SYSTEM FOR PROTECTING CPU CORE BY IDENTIFYING DATA AND INSTRUCTIONS

(71) Applicant: Idaho Scientific LLC, Boise, ID (US)

(72) Inventors: Dale Weston Reese, Boise, ID (US); Matthew Ryan Waltz, Boise, ID (US); Jay Takeji Hirata, Meridian, ID (US); Andrew James Weiler, Nampa, ID (US); Nathan Charles Chrisman, Nampa, ID (US); Claude Harmon Garrett, V, Meridian, ID (US)

(73) Assignee: IDAHO SCIENTIFIC LLC, Boise, ID (US)

( * ) Notice: Subject to any disclaimer, the term of this patent is extended or adjusted under 35 U.S.C. 154(b) by 0 days.

(21) Appl. No.: 17/965,659

(22) Filed: Oct. 13, 2022

Related U.S. Application Data

(63) Continuation of application No. 17/889,010, filed on Aug. 16, 2022.

(51) Int. Cl.
*G06F 3/06* (2006.01)

(52) U.S. Cl.
CPC ............. *G06F 3/064* (2013.01); *G06F 3/062* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,809,546 A | 9/1998 | Greenstein et al. | |
| 2001/0029574 A1 | 10/2001 | Razdan et al. | |
| 2017/0293575 A1* | 10/2017 | Best | G11C 13/0059 |
| 2018/0260339 A1* | 9/2018 | Shallal | G06F 12/1408 |
| 2020/0019324 A1* | 1/2020 | Wang | G06F 3/0655 |
| 2021/0194870 A1* | 6/2021 | Allo | G06F 15/7807 |
| 2021/0263746 A1* | 8/2021 | Thom | G06F 9/4406 |
| 2021/0357125 A1* | 11/2021 | Mendes | G06F 13/4004 |

OTHER PUBLICATIONS

Non-Final Office Action received for U.S. Appl. No. 17/965,762, dated Mar. 15, 2023, 8 pages.

* cited by examiner

*Primary Examiner* — Kevin Verbrugge
(74) *Attorney, Agent, or Firm* — Workman Nydegger

(57) ABSTRACT

Hardware enforced CPU core protection by identification of digital blocks as instructions or data. A method includes, at a memory controller shim, receiving, from a CPU core, a memory read request. The memory read request comprises an address for a block. The block at the address is requested from a memory. The block is received from the memory. At least one of a decryption key or an authentication key is accessed. At least one of a decryption transformation or an authentication transformation is performed on the block using the decryption key or the authentication key. When the decryption transformation or authentication transformation is deemed valid, a plain text version of the block is returned to the CPU core for consumption. When the decryption transformation or authentication transformation is deemed invalid, the CPU core is prevented from consuming the plain text version of the block.

20 Claims, 5 Drawing Sheets

SYSTEM FOR PROTECTING CPU CORE BY IDENTIFYING DATA AND INSTRUCTIONS

CROSS-REFERENCE TO RELATED APPLICATIONS

This application is a continuation of U.S. patent application Ser. No. 17/889,010 filed on Aug. 16, 2022, entitled "SYSTEM FOR PROTECTING CPU CORE BY IDENTIFYING DATA AND INSTRUCTIONS," and which application is expressly incorporated herein by reference in its entirety.

This invention was made with government support under contract no. FA864921P1575 with FA8649, awarded by USAF RESEARCH LAB AFRL SBRK. The government has certain rights in the invention.

BACKGROUND

Background and Relevant Art

Computers and computing systems have affected nearly every aspect of modern living. Computers are generally involved in work, recreation, healthcare, transportation, entertainment, household management, etc. Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Given the widespread use of computers and their interconnected nature, and particularly the use of computers in embedded systems, attacks on such systems by various actors have increased at an alarming rate. So called cyber-attacks do and will continue to put critical infrastructure at risk by targeting inherently vulnerable industrial control systems (ICS). Additionally, due to the connected nature of even many simple user devices, home and business users are at risk for having large numbers of items they own at risk, including everything from the most mundane items to having embedded systems therein to more complex systems such as automobiles or home or business automation systems. Recent cyber-attacks have shown that cyber equipped adversaries are actively targeting industrial control infrastructure to achieve their goals. While attackers are pivoting to target vulnerabilities in ICS infrastructure, protection mechanisms have not adequately responded to protect ICS infrastructure.

The current approach in ICS and other security measures is insufficient in addressing the various adversaries. Industry is focused on perimeter defense, firewalls, and anti-virus solutions found in enterprise information technology (IT) techniques. Most of these are at best "bandages" and do not address the vulnerable mechanisms in computer hardware and software. Indeed, current computer architectures are generally inadequate for countering the various current attack vectors.

In particular, current computing architectures suffer from memory corruption vulnerabilities. The vulnerabilities are inherited from inadequacies in processors. For example, in a von Neumann architecture, there is no difference in storage of program instructions (sometimes referred to as 'code') and data. That is, memory and persistent storage (e.g., disk storage) store program instructions and data in blocks without regard to differentiating, either temporally or otherwise, in the memory and persistent storage, between program instructions and data. Thus, for example, data storage operations, including intentionally faulty operations, can be used to corrupt instruction blocks to cause operating errors or to inject known nefarious instructions. In sum, memory is simply not secure.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of hardware enforced CPU core protection by identification of digital blocks as instructions or data. The method includes, at a memory controller shim, receiving, from a CPU core, a memory read request. The memory read request comprises an address for a block. The block at the address is requested from a memory. The block is received from the memory. At least one of a decryption key or an authentication key is accessed. At least one of a decryption transformation or an authentication transformation is performed on the block using the decryption key or the authentication key. When the decryption transformation or authentication transformation is deemed valid, a plain text version of the block is returned to the CPU core for consumption. When the decryption transformation or authentication transformation is deemed invalid, the CPU core is prevented from consuming the plain text version of the block.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
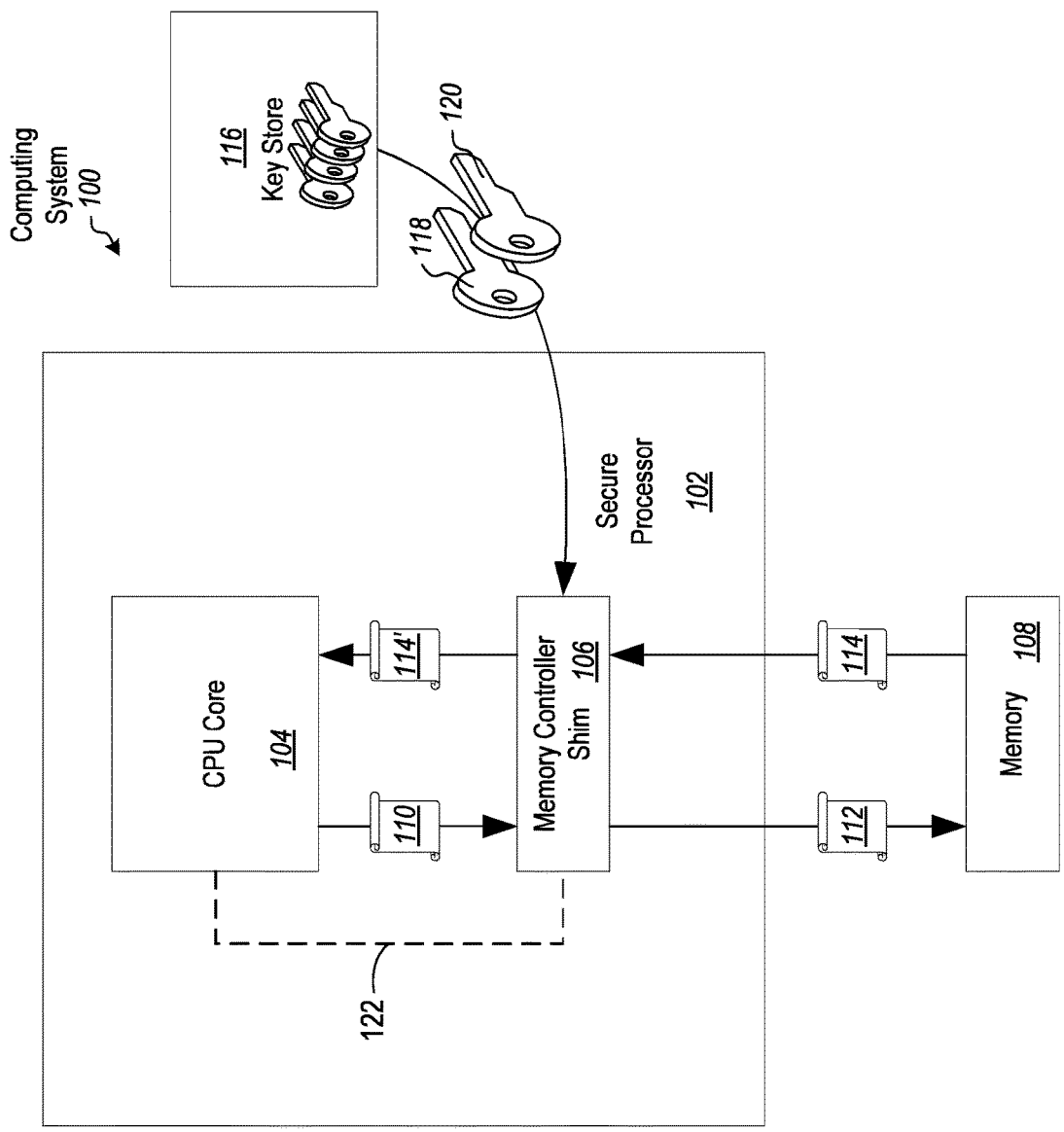
FIG. 1 illustrates a block diagram illustrating a computing system including an integrated secure processor configured for hardware enforced CPU core protection.

Embodiments illustrated herein include functionality for obtaining a digital block, such as a digital block of instructions or data from memory, performing a transformation over the digital block, and based on the results of the transformation over the digital block, determining whether or not the digital block is an instruction. If the digital block is an instruction, then the digital block (including a plaintext version of the digital block) can be returned to a CPU core for consumption (e.g., execution).

Alternatively, or additionally, embodiments may perform a transformation over the digital block, and based on the results of the transformation over the digital block, determine whether or not the digital block is data. If the digital block is data, then the digital block (including a plaintext version of the digital block) can be returned to a CPU core for consumption.

Alternatively, or additionally, embodiments may perform a transformation over the digital block, and based on the results of the transformation over the digital block, determine (and distinguish) that the digital block is one, and only one, of instruction(s), data, or invalid. If the digital block is determined to be instruction(s), then the digital block (including a plaintext version of the digital block) can be returned to a CPU core for consumption by execution. If the digital block determined to be data, then the digital block (including a plaintext version of the digital block) can be returned to a CPU core for consumption as data. If the digital block is determined to be invalid, then the digital block is prevented from being provided to the CPU core.

Note that the transformation is performed within a security boundary such that transformation is performed at a time and/or location where external modifications on the block are prevented. Note that in some embodiments, as mentioned above, performing the transformation on the block can be used to distinguish data blocks from instruction blocks, and in some embodiments from invalid blocks.

In particular, several technical problems exist with current computing systems. One technical problem relates to code injections problems whereby malicious code can be injected into a memory structure where the code is then consumed by a CPU core resulting in data loss, data theft, data corruption, and/or even damage to physical systems. Another technical problem relates to that ability of malicious actors to change code at various locations along a data path. In this way, these malicious actors can substitute desired code for malicious code without detection. Another technical problem relates to the ability to read data and instructions in memory. Thus, if a malicious actor is able to access the memory, data and instructions can be inappropriately accessed and/or stolen. Embodiments solve the technical problems using technical solutions such as those illustrated below.

Various embodiments include various unique technical features. For example, embodiments may include functionality for distinguishing between instructions and data. Embodiments may include functionality for authenticating and/or decrypting instructions and/or data. Embodiments may include functionality for performing just in time decryption and/or authentication to enforce a security boundary by preventing modification of blocks after decryption and/or authentication and before consumption by the CPU core. Embodiments may be implemented where novel authenticating and/or decrypting functionality is implemented at a first level cache controller. This allows for enforcement of spatial security boundaries to prevent modification of blocks after decryption and/or authentication and before consumption by the CPU core.

Additional details are now illustrated. FIG. 1 illustrates a computing system 100. In this example, the computing system 100 includes a secure processor 102. Note that in this example, the secure processor 102 is an integrated processor that includes a CPU core 104 and a memory controller shim 106 implemented in an integrated fashion. This may be, for example, by being implemented on the same silicon die, implemented in the same semiconductor package, etc. Note that in other embodiments, such as the example illustrated in FIG. 2, the memory controller shim 106 can be implemented as bolt-on components that can be implemented outside of a secure processor, but nonetheless adds security features disclosed herein. Indeed, a CPU core's existing instruction set architecture (ISA) can be used meaning that the improvements illustrated herein can be implemented without a need to re-architect system software. Thus, for example, some embodiments may be implemented where a bolt-on memory controller shim 106 can be added to an existing system to provide additional functionality.

Returning once again to FIG. 1, the CPU core 104 may be a conventional CPU core including its own integrated memory controller. However, conventional memory controllers do not include functionality for performing transformations over blocks for determining if the blocks contain valid instructions (or data). Thus, by coupling the memory controller shim 106 to an internal memory controller in the CPU core 104, the additional securing functionality illustrated herein can be implemented.

The computing system includes memory 108 coupled to the memory controller shim 106. The memory 108 is configured to store blocks of instructions and/or data. Note that typically, the memory 108 will simultaneously store both instructions and data. Indeed, in many embodiments, such blocks will be stored in a fashion that does not distinguish, within the memory 108 itself, between data and instructions.

The following illustrates several example scenarios illustrating various features of various embodiments of the invention.

In a first example, a generic example of handling a digital block is illustrated. The following can be performed whether the digital block is instructions or data. This example illustrates hardware enforced gatekeeping of digital blocks being provided to a CPU core. The enforcement is performed by particular hardware. In this example, the memory controller shim 106 enforces the gatekeeping functionality.

In this example, embodiments perform acts for identifying a digital block as an instruction or data. That is, embodiments include functionality for hardware enforced CPU core protection by identification of digital blocks as instructions or data. In this example, a transformation is performed by the memory controller shim 106 over the digital block 114 obtained from memory 108. Based on the results of the transformation the memory controller shim 106 identifies the digital block 114 as an instruction or data.

In one example of a transformation, a decryption key 118 that is only suitable for instructions may be used to decrypt the block 114. If a valid instruction is obtained by decrypting the block 114 using the decryption key 118 specifically used to decrypt instructions, then some embodiments can determine that the block 114 is an instruction. In contrast, if no valid instruction is obtained by using the decryption key 118 to decrypt the block 114, then, in some embodiments, it may be assumed that the block 114 is data. Alternatively, it may be assumed that the block 114 is invalid.

Similarly, in another example of a transformation, a decryption key 118 that is only suitable for data may be used to decrypt the block 114. If valid data is obtained by decrypting the block 114 using the decryption key 118 specifically used to decrypt data, then some embodiments can determine that the block 114 is data. In contrast, if no valid data is obtained by using the decryption key 118 to decrypt the block 114, then, in some embodiments, it may be assumed that the block 114 is invalid. In such case, it will typically not be assumed that the block is instructions as this could prove harmful to the computing system 100.

Similarly, in another example of a transformation, an authentication key 120 that is only suitable for instructions may be used to authenticate the block 114. If authentication of the block 114 using the authentication key 120 succeeds, then some embodiments can determine that the block 114 is instructions. In contrast, if authentication of the block 114 using the authentication key 120 fails, then, in some embodiments, it may be assumed that the block 114 is data. Alternatively, it may be assumed that the block 114 is invalid.

Similarly, in another example of a transformation, an authentication key 120 that is only suitable for data may be used to authenticate the block 114. If authentication of the block 114 using the authentication key 120 succeeds, then some embodiments can determine that the block 114 is data. In contrast, if authentication of the block 114 using the authentication key 120 fails, then, in some embodiments, it may be assumed that the block 114 is invalid. In such case, it will typically not be assumed that the block is instructions as this could prove harmful to the computing system 100.

In some embodiments, prior to performing the transformation actions may be performed positing that the block is either an instruction or data. For example, FIG. 1 illustrates a signal 122 transmitted by the CPU core 104 and received by the memory controller shim 106. The signal can identify that a particular digital block 114 being processed by the memory controller shim 106 should be an instruction (or alternatively, data).

For example, in some embodiments, the signal 122 may identify the digital block 114 as being an instruction. If the digital block 114 is not able to be decrypted using a decryption key for instructions, then the digital block 114 can be determined to be invalid. Similarly, if the digital block is not able to be authenticated using an authentication key for instructions, then the digital block 114 can be determined to be invalid. Similar operations can be performed when the digital block 114 is posited to be data.

In some embodiments, when the block 114 is identified as an instruction, the memory controller shim 106, as a result, returns the block for execution.

Note that in various embodiments, the transformation may be a transformation where the block is subject to authentication, decryption, or authentication and decryption.

In an alternative example, FIG. 1 illustrates that the memory controller shim 106 receives from a CPU core 104, a memory read request 110. The memory read request 110 comprises an instruction/data flag indicating whether the memory read request 110 is an instruction request or a data request and a block address. In some embodiments, the flag may be implemented by the signal 122 as illustrated in FIG. 1.

The memory controller shim 106, in response, sends a block request 112 to memory 108 to request the block 114 identified by the block address. Thus, the block request 112 requests the block 114 at the address from the memory 108.

The memory controller shim 106 receives the block 114 specified in the block request 112 from the memory 108. At this point, the block 114 is uncategorized and/or unverified.

The memory controller shim 106 can categorize the block 114 as instructions, data, and/or invalid. When the block 114 is uncategorized, the memory controller shim 106 has not yet categorized the block 114 as instructions, data, and/or invalid. However, in some embodiments, the memory controller shim 106 includes functionality for categorizing the block 114.

To accomplish this, the memory controller shim 106 accesses, from a key store 116 a decryption key 118 and an authentication key 120, although, in some embodiments the decryption key 118 can be omitted. In some embodiments, the decryption key 118 and authentication key can be included in a key manifest provided to the memory shim controller shim 106. The key manifest may be configured to only be able to be accessed if the memory controller shim 106 meets certain requirements, such as having an appropriate configuration, an appropriate credential, and the like to be able to decrypt the key manifest. In some embodiments, the key manifest may include multiple different keys, but only keys appropriate for the particular memory controller shim 106 will be accessible by the memory controller shim 106.

The memory controller shim 106 then performs an authentication transformation on the block 114 using the authentication key 120. When the authentication transformation is deemed valid, such as when an authentication transformation returns an expected value, then the memory controller shim 106 returns a plain text version 114' of the block 114 to the CPU core 104 for consumption by the CPU core 104. In some embodiments, the plaint text version 114' of the block 114 may be created by decrypting the block 114 using the decryption key 118. Note that in some embodiments, the decryption key 118 and authentication key 120 are the same key. In contrast, when the authentication transformation is deemed invalid, such as when an authentication transformation returns an unexpected value, then the memory controller shim 106 prevents the CPU core 104 from consuming the plain text version of the block. This may be accomplished by simply preventing the block 114 or a plain text version 114' of the block 114 from being delivered to the CPU core 104. Alternatively, or additionally, this may be accomplished by alerting the CPU core 104 to not consume the block 114, including any derivatives thereof.

As noted above, in some embodiments, the decryption key 118 and authentication key 120 are the same key. That is, the same key can be used to both authenticate a block 114 as well as to decrypt the block 114 to produce the plain text version 114' of the block 114.

Note that embodiments may include functionality for writes directed by the CPU core 104. For example, in some embodiments, the memory controller shim 106 receives a memory write request from the CPU core 104 to write a block to the memory 108. In some such examples, the memory write request includes a flag indicating that the request is a request to write an instruction to the memory 108. Some embodiments may be implemented where such requests will be blocked. That is, the memory controller shim will refuse to write blocks to memory 108 where the block are instruction blocks. This prevents malicious code from being injected into the memory 108 by the CPU core 104.

In some embodiments, the memory controller shim 106 receives a memory write request from the CPU core 104 to write a write block. The memory write request includes an instruction/data flag (e.g., the signal 122) indicating a data request. As a result, the memory controller shim 106 performs a transformation using the authentication key and decryption key to create encrypted data and authenticatable data. This transformed data can be written to the memory 108 where it is secure. When the data is accessed again by the memory controller shim 106, the memory controller shim 106 can decrypt the data, as well as authenticate the data.

Figure 2:
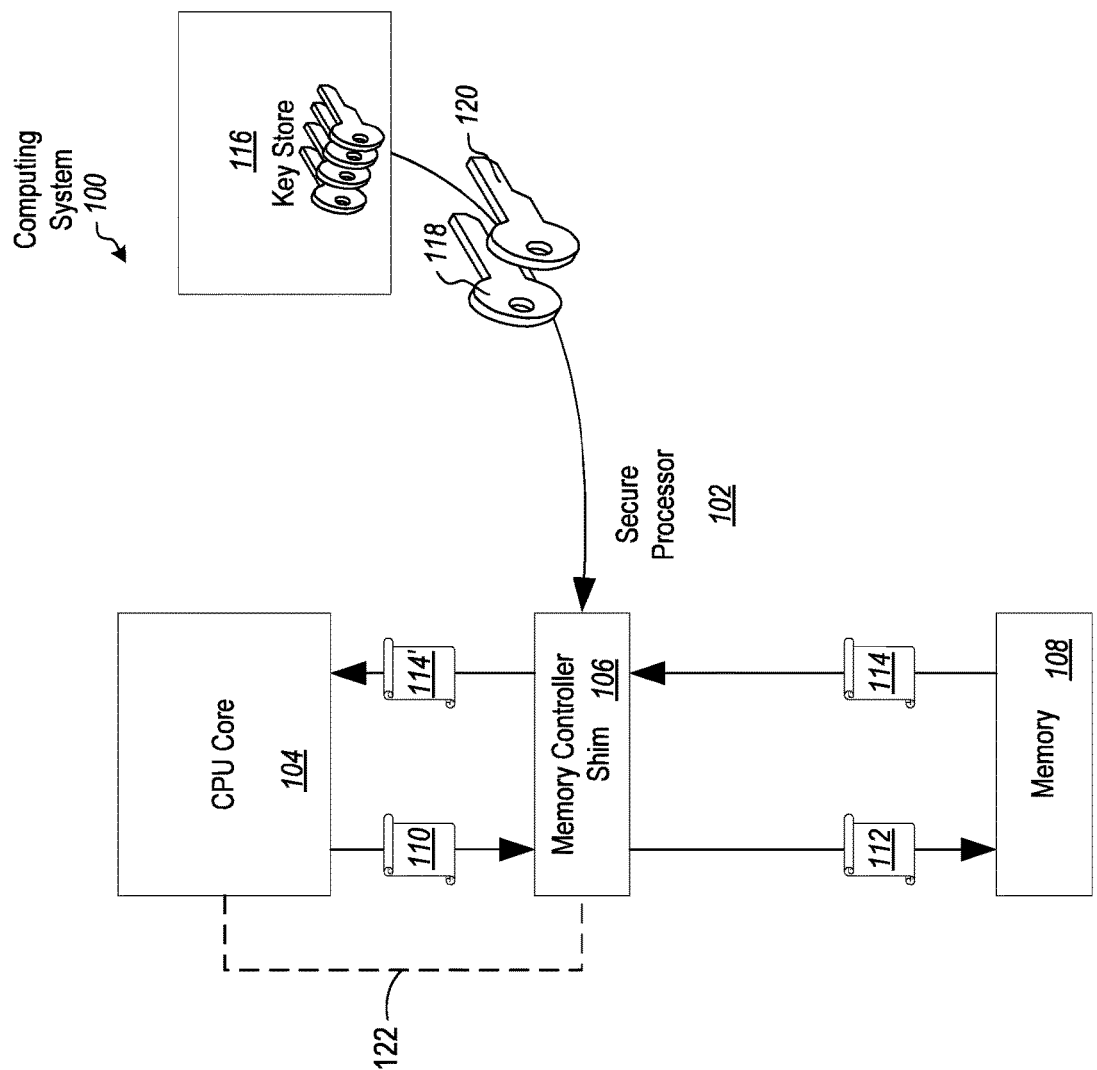
FIG. 2 illustrates a block diagram illustrating a computing system including bolt on memory controller shim configured for hardware enforced CPU core protection.

As noted above, some embodiments implement a novel secure processor architecture with more secure instruction and data handling. Rather than simply patching vulnerabilities and hoping new vulnerabilities do not arise, embodiments can Instead directly address the flaws and vulnerabilities of current architectures. This can be done where a new architecture can be implemented as a secure processor 102 as illustrated in FIG. 1. Alternatively, this can be done without needing to rearchitect by using a bolt-on system to existing architecture CPU cores, including using existing ISAs allowing system designers to adopt using existing source code, libraries, test and development environments. Examples of this are illustrated in FIG. 2.

Figure 3:
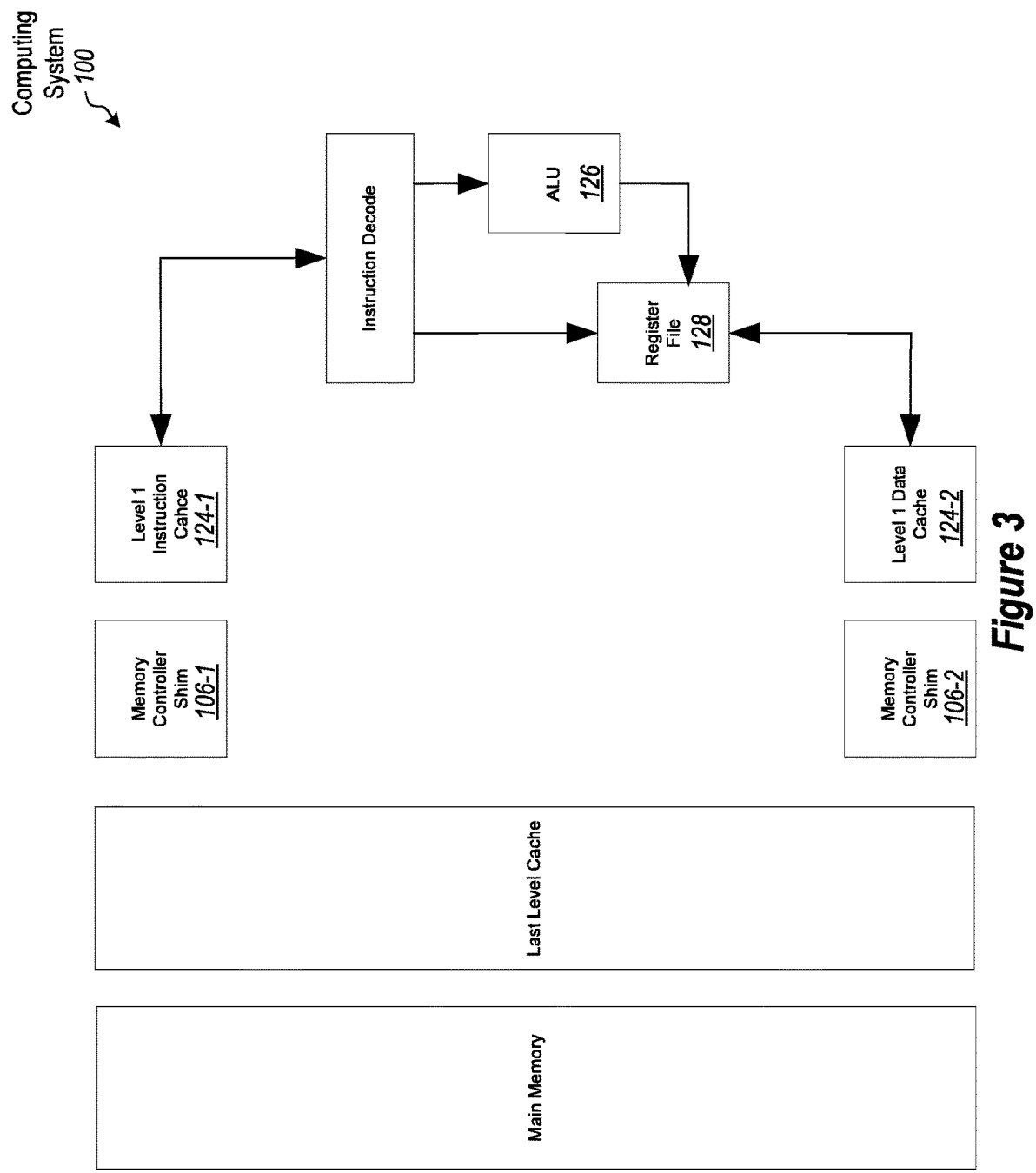
FIG. 3 illustrates a block diagram illustrating a computing system having an instruction path and a data path with corresponding memory controller shims configured for hardware enforced CPU core protection.

Note that also while CPU core protection is illustrated using various specialized keys in the memory controller shim 106 to separate instructions and data, in other embodiments, separate instruction and data busses can be used to separate instructions and data. An example of this is illustrated in FIG. 3. In FIG. 3, two memory controller shims are illustrated, including a memory controller shim 106-1 for instructions and a memory controller shim 106-2 for data. Each of these shims is able to obtain appropriate keys from a key store for authentication and/or decryption as described previously herein. However, instructions and data are physically separated with respect to the busses used to provide the instructions and data to the CPU core, which in the example illustrated in FIG. 3 includes a dedicated Level 1 instruction cache 124-1 and a dedicated Level 1 data cache 124-2, an arithmetic logic unit 126 where instructions can be provided, and a register file 128 where data can be provided. In this example, the memory controller shim 106-1 uses instruction decryption and authentication keys while the memory controller shim 106-2 uses data decryption and authentication keys in a fashion similar to that described above.

Note that the systems described above are particularly useful in embedded system. ICS, programmable logic controllers, power generation and distribution, inverters, smart meters, variable control motor drives, temperature sensors, HVAC controllers, perimeter access equipment, vehicles (unmanned and manned), home and business automation equipment, etc.

Some embodiments illustrate herein take advantage of the Harvard Architecture, with modifications, to obtain a secure foundation and build upon its inherent resilience to memory corruption exploits by adding the ability to facilitate just-in-time decryption of instructions and data within the security boundary of the CPU core. This concept is illustrated in FIG. 3, which shows that instruction and data interfaces are each equipped with their own hardware-based crypto engine in the memory controller shims 106-1 and 106-2.

Note that some embodiments essentially use a unified last level cache and main memory, in effect, violating the true Harvard Architecture. This is done intentionally to leverage the benefits of a modified Harvard architecture. A modified Harvard architecture reduces the size weight and power required to support physically separate memory interfaces. In addition, the modified Harvard architecture accommodates the design of linkers and loaders for existing modern operating systems. Even with the united main memory, embodiments are able to maintain a security stance with isolation of instructions and data.

This is accomplished by maintaining separate cryptographic keys for the instruction memory and data memory. Although the encrypted instructions and data are stored in the same physical memory, data encrypted with the data key cannot be read and decrypted by the instruction interface and vice versa.

Embodiments provide one or more of several very unique capabilities when adapted to an existing system. First, the processor design mitigates the entire class of memory corruption exploits which represent a majority of zero-day attacks. Second, through the uses of key management, the OEM or system owner can cryptographically enforce, authorize, and restrict what code can operate on the system. In some embodiments, only instructions encrypted with the correct key will be able to be executed by the processor. This ensures that a malicious adversary cannot replace or modify the firmware and applications that run on the device. This prevents a wide range of physical and virtual cyber-attacks.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
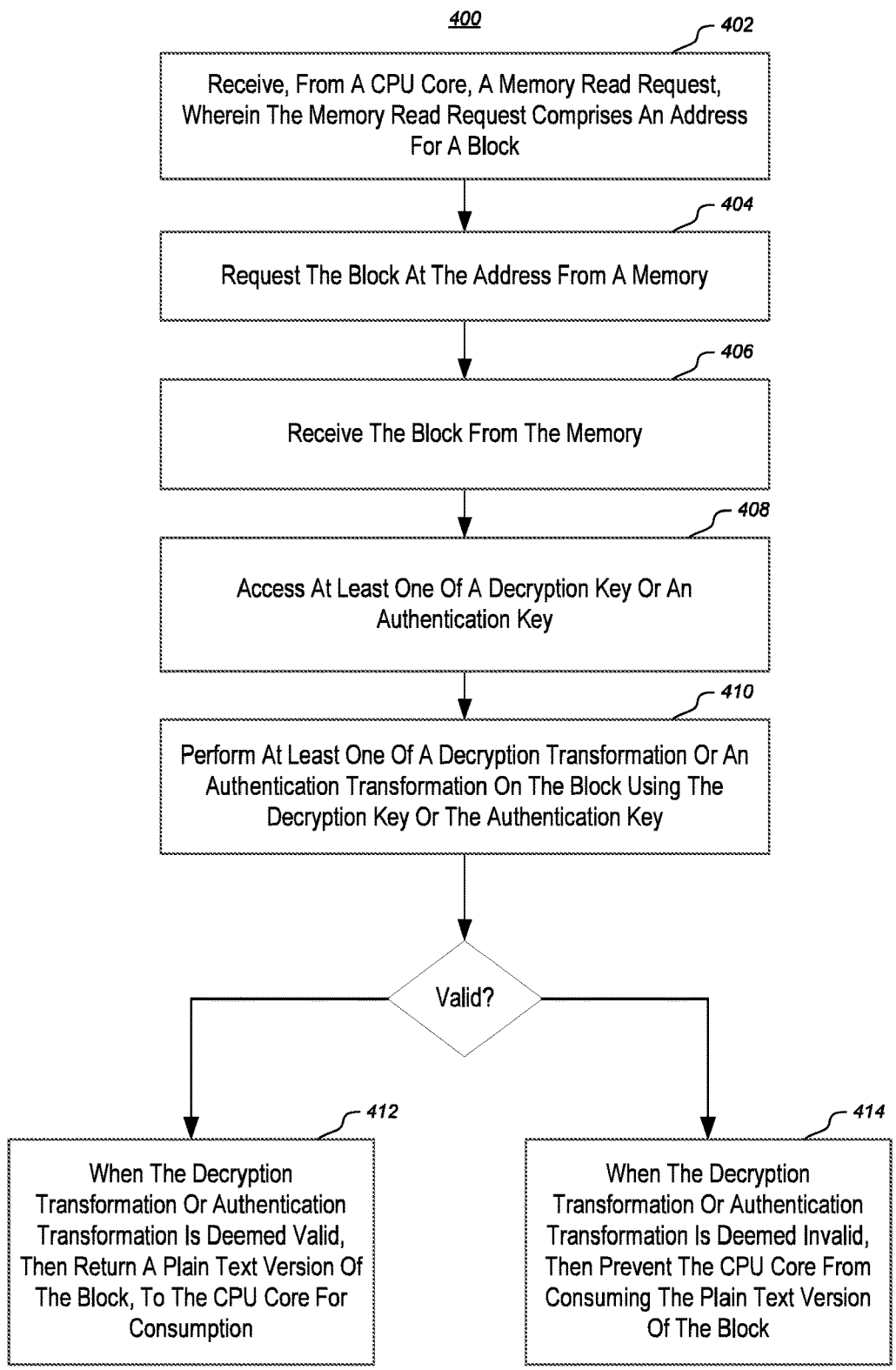
FIG. 4 illustrates a method of hardware enforced CPU core protection.

Referring now to FIG. 4, a method 400 is illustrated. The method 400 includes acts for hardware enforced CPU core protection by identification of digital blocks as instructions or data. The method 400 includes, at a memory controller shim, receiving, from a CPU core, a memory read request, wherein the memory read request comprises an address for a block (act 402).

The method 400 further includes requesting the block at the address from a memory (act 404).

The method 400 further includes receiving the block from the memory (act 406).

The method 400 further includes accessing at least one of a decryption key or an authentication key (act 408).

The method 400 further includes performing at least one of a decryption transformation or an authentication transformation on the block using the decryption key or the authentication key (act 410).

The method 400 further includes when the decryption transformation or authentication transformation is deemed valid, then returning a plain text version of the block, to the CPU core for consumption (act 412).

The method 400 further includes when the decryption transformation or authentication transformation is deemed invalid, then preventing the CPU core from consuming the plain text version of the block (act 414).

The method 400 may be practiced where preventing the CPU core from consuming the plain text version of the block comprises preventing the plain text version of the block from being returned to the CPU core.

The method 400 may be practiced where preventing the CPU core from consuming the plain text version of the block comprises alerting the CPU core to not consume the plain text version of the block.

The method 400 may be practiced where both a decryption transformation and an authentication transformation are performed. In some such embodiments, the decryption key and authentication key are the same key.

The method 400 may further include receiving a memory write request from the CPU core to write a write block, wherein the memory write request comprises an instruction/data flag indicating an instruction request, and as a result, preventing the write block from being written to the memory.

The method 400 may further include receiving a memory write request from the CPU core to write a write block, wherein the memory write request comprises an instruction/data flag indicating a data request, and as a result, performing a transformation using at least one of the authentication key or decryption key, and writing the data in the memory write request to the memory.

Figure 5:
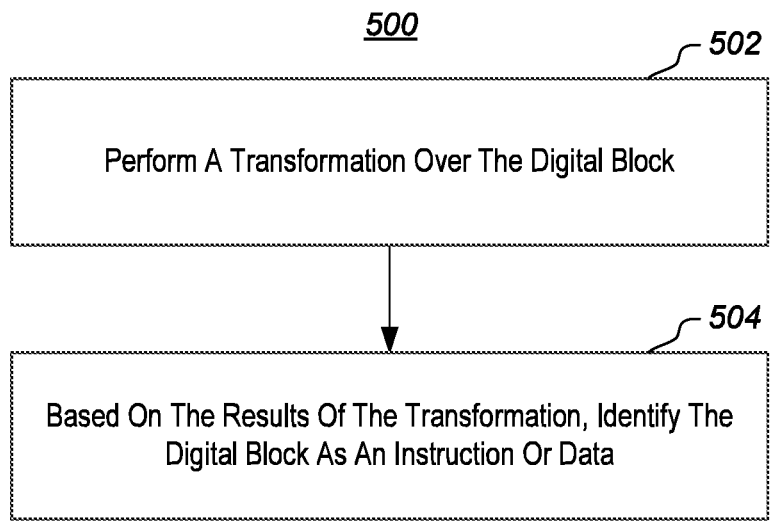
FIG. 5 illustrates a method of separating instructions and data.

Referring now to FIG. 5, a method 500 is illustrated. The method 500 includes acts for hardware enforced CPU core protection. The method 500 includes performing a transformation over the digital block (act 502).

Based on the results of the transformation, the method 500 further includes identifying the digital block as an instruction or data (act 504). Thus, for example, various acts of authentication and/or decryption can be used to determine if the block is a valid instruction or valid data.

The method 500 further includes prior to performing the transformation positing that the block is either instruction or data. An example of this is illustrated in FIG. 1 where the signal 122 is used to indicate whether a block is instructions or data.

The method 500 further includes identifying that the block is an instruction, and as a result the particular hardware returning the block for execution. The block is returned to the CPU core, such as CPU core 104.

The method 500 may be practiced where the transformation comprises a decryption transformation.

The method 500 may be practiced where the transformation comprises an authentication transformation.

The method 500 may be practiced where the block is subject to authentication, encryption, or authentication and encryption.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of hardware enforced CPU core protection by identification of digital blocks as instructions or data, the method comprising:
    at a memory controller shim, receiving, from a CPU core, a memory read request, wherein the memory read request comprises an address for a block;
    requesting the block at the address from a memory;
    receiving the block from the memory;
    accessing at least one of a decryption key or an authentication key;
    performing at least one of a decryption transformation or an authentication transformation on the block using the decryption key or the authentication key;
    when the decryption transformation or authentication transformation is deemed valid, then returning a plain text version of the block, to the CPU core for consumption; and
    when the decryption transformation or authentication transformation is deemed invalid, then preventing the CPU core from consuming the plain text version of the block.

2. The method of claim 1, wherein preventing the CPU core from consuming the plain text version of the block comprises preventing the plain text version of the block from being returned to the CPU core.

3. The method of claim 1, wherein preventing the CPU core from consuming the plain text version of the block comprises alerting the CPU core to not consume the plain text version of the block.

4. The method of claim 1, wherein both a decryption transformation and an authentication transformation are performed.

5. The method of claim 4, wherein the decryption key and authentication key are the same key.

6. The method of claim 1, further comprising receiving a memory write request from the CPU core to write a write block, wherein the memory write request comprises an instruction/data flag indicating an instruction request, and as a result, preventing the write block from being written to the memory.

7. The method of claim 1, further comprising receiving a memory write request from the CPU core to write a write block, wherein the memory write request comprises an instruction/data flag indicating a data request, and as a result, performing a transformation using at least one of the authentication key or decryption key, and writing the data in the memory write request to the memory.

8. One or more non-transitory computer readable media comprising computer executable instructions that when executed by one or more processors cause the one or more processors to perform the following:
    at a memory controller shim, receiving, from a CPU core, a memory read request, wherein the memory read request comprises an address for a block;
    requesting the block at the address from a memory;
    receiving the block from the memory;
    accessing at least one of a decryption key or an authentication key;
    performing at least one of a decryption transformation or an authentication transformation on the block using the decryption key or the authentication key;
    when the decryption transformation or authentication transformation is deemed valid, then returning a plain text version of the block, to the CPU core for consumption; and
    when the decryption transformation or authentication transformation is deemed invalid, then preventing the CPU core from consuming the plain text version of the block.

9. The non-transitory computer readable media of claim 8, wherein preventing the CPU core from consuming the plain text version of the block comprises preventing the plain text version of the block from being returned to the CPU core.

10. The non-transitory computer readable media of claim 8, wherein preventing the CPU core from consuming the plain text version of the block comprises alerting the CPU core to not consume the plain text version of the block.

11. The non-transitory computer readable media of claim 8, wherein both a decryption transformation and an authentication transformation are performed.

12. The non-transitory computer readable media of claim 11, wherein the decryption key and authentication key are the same key.

13. The non-transitory computer readable media of claim 8, further comprising computer executable instructions that when executed by the one or more processors cause the one or more processors to receive a memory write request from the CPU core to write a write block, wherein the memory write request comprises an instruction/data flag indicating an instruction request, and as a result, preventing the write block from being written to the memory.

14. The non-transitory computer readable media of claim 8, further comprising computer executable instructions that when executed by the one or more processors cause the one or more processors to receive a memory write request from the CPU core to write a write block, wherein the memory write request comprises an instruction/data flag indicating a data request, and as a result, performing a transformation using at least one of the authentication key or decryption key, and writing the data in the memory write request to the memory.

15. A computer system comprising:
    one or more processors; and
    one or more computer-readable media having stored thereon instructions that are executable by the one or more processors to configure the computer system to enforce CPU core protection by identification of digital blocks as instructions or data, including instructions that are executable to configure the computer system to perform at least the following:
    at a memory controller shim, receiving, from a CPU core, a memory read request, wherein the memory read request comprises an address for a block;
    requesting the block at the address from a memory;
    receiving the block from the memory;

accessing at least one of a decryption key or an authentication key;

performing at least one of a decryption transformation or an authentication transformation on the block using the decryption key or the authentication key;

when the decryption transformation or authentication transformation is deemed valid, then returning a plain text version of the block, to the CPU core for consumption; and when the decryption transformation or authentication transformation is deemed invalid, then preventing the CPU core from consuming the plain text version of the block.

16. The computer system of claim 15, wherein preventing the CPU core from consuming the plain text version of the block comprises preventing the plain text version of the block from being returned to the CPU core.

17. The computer system of claim 15, wherein preventing the CPU core from consuming the plain text version of the block comprises alerting the CPU core to not consume the plain text version of the block.

18. The computer system of claim 15, wherein both a decryption transformation and an authentication transformation are performed.

19. The computer system of claim 18, wherein the decryption key and authentication key are the same key.

20. The computer system of claim 15, wherein the one or more computer-readable media further have stored thereon instructions that are executable by the one or more processors to configure the computer system to receive a memory write request from the CPU core to write a write block, wherein the memory write request comprises an instruction/data flag indicating an instruction request, and as a result, prevent the write block from being written to the memory.

* * * * *